March 22, 1932. E. PITCHER 1,850,357
QUACK GRASS DIGGER
Filed May 19, 1930 4 Sheets-Sheet 1

Inventor
Elmer Pitcher
By his Attorneys

March 22, 1932.    E. PITCHER    1,850,357
QUACK GRASS DIGGER
Filed May 19, 1930    4 Sheets-Sheet 2
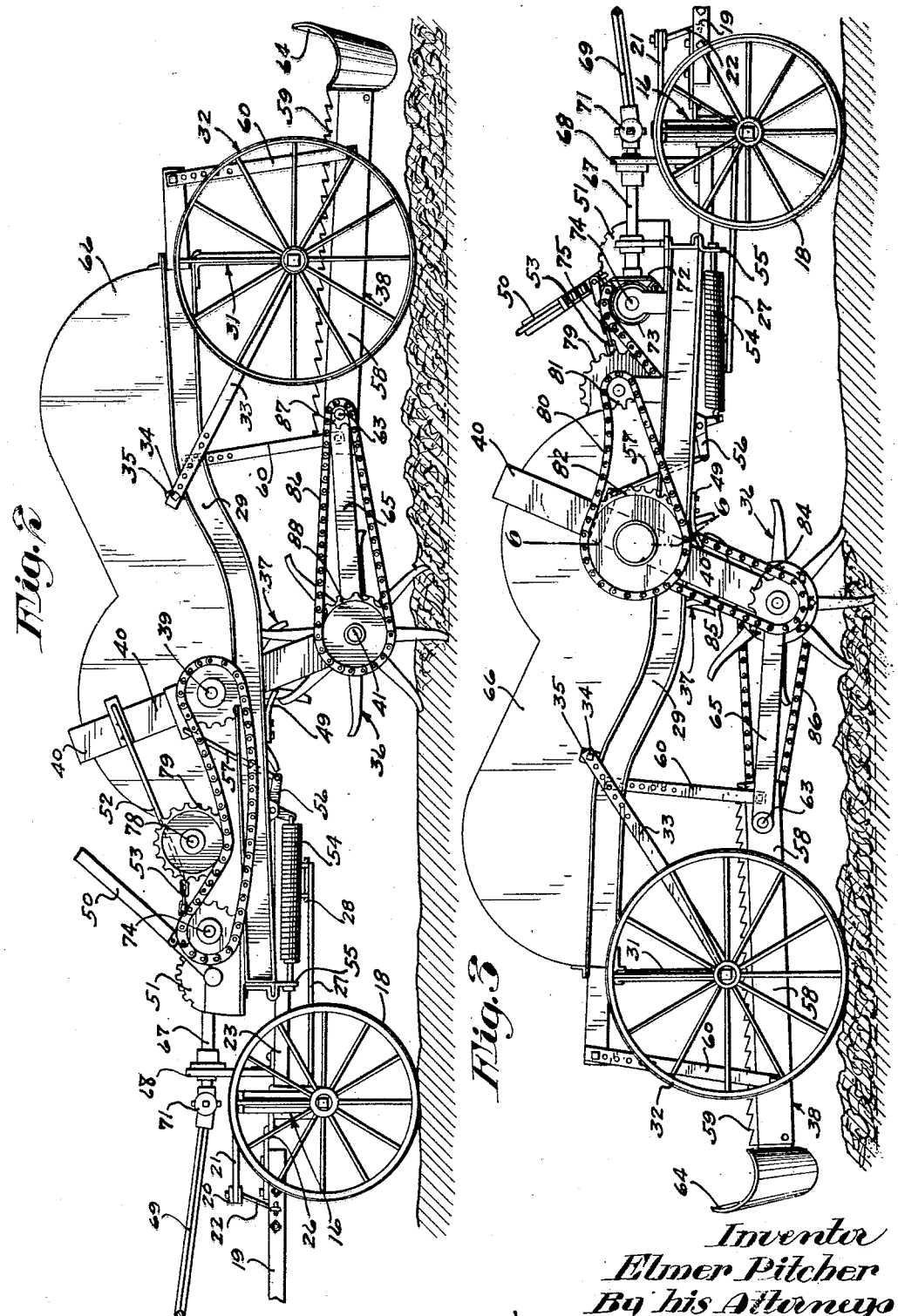
Inventor
Elmer Pitcher
By his Attorneys
Merchant and Krieger

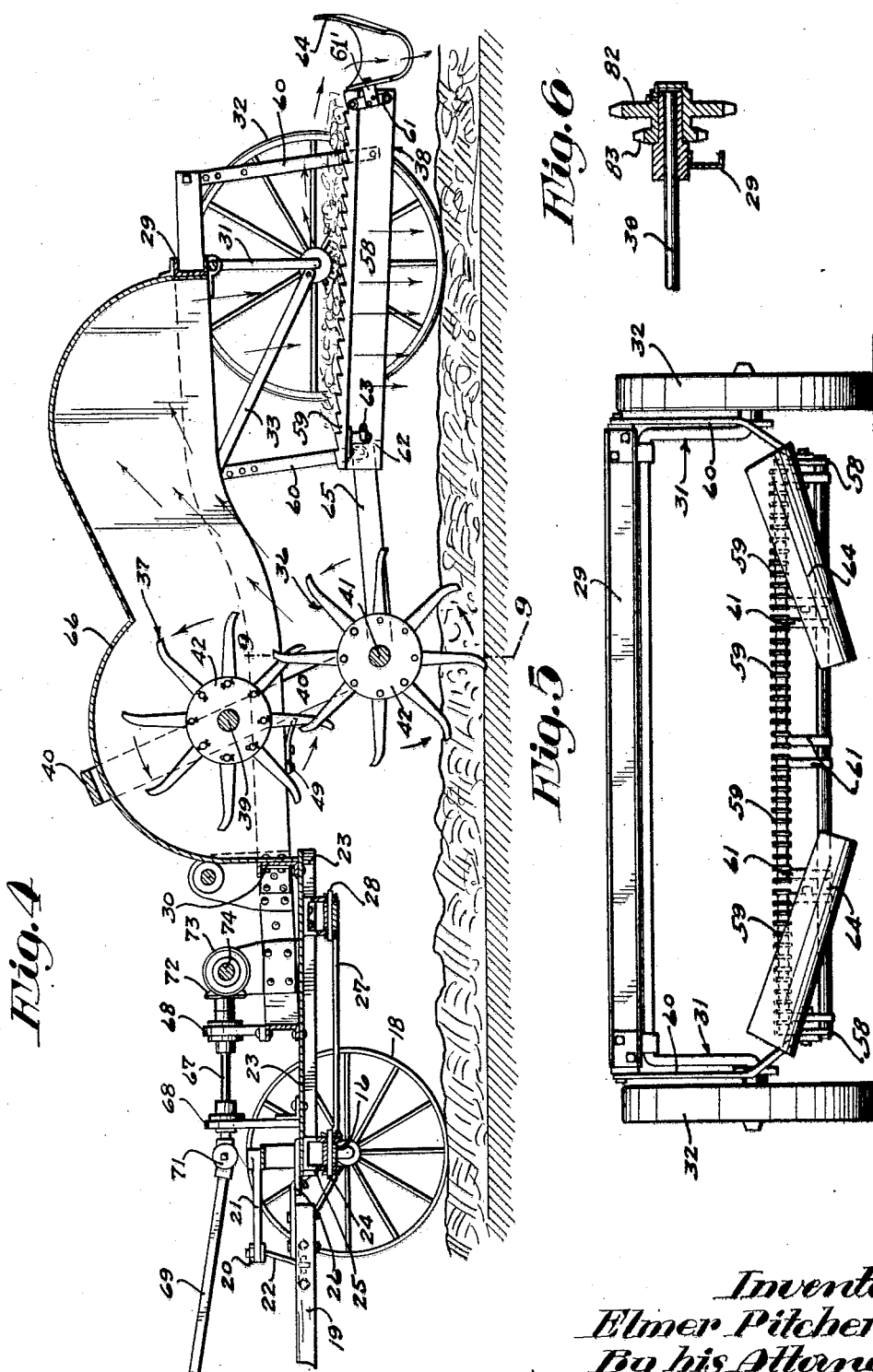

March 22, 1932. E. PITCHER 1,850,357
QUACK GRASS DIGGER
Filed May 19, 1930 4 Sheets-Sheet 4

Inventor
Elmer Pitcher
By his Attorneys

Patented Mar. 22, 1932

1,850,357

UNITED STATES PATENT OFFICE

ELMER PITCHER, OF MINNEAPOLIS, MINNESOTA, ASSIGNOR TO EMIL PIFER, OF DAVENPORT, NORTH DAKOTA

QUACK GRASS DIGGER

Application filed May 19, 1930. Serial No. 453,548.

My present invention has for its object to provide a highly efficient quack grass digger and, to this end, it consists of the novel devices and combinations of devices hereinafter described and defined in the claims.

In the accompanying drawings, which illustrate the invention, like characters indicate like parts throughout the several views.

Referring to the drawings:

Figs. 2 and 3 are left and right side elevations, respectively, of the same;

Fig. 4 is a view partly in longitudinal central section taken substantially on the line 4—4 of Fig. 1;

Fig. 5 is a rear end elevation;

Fig. 6 is a fragmentary detail view principally in section taken on the line 6—6 of Fig. 3;

Figure 1:
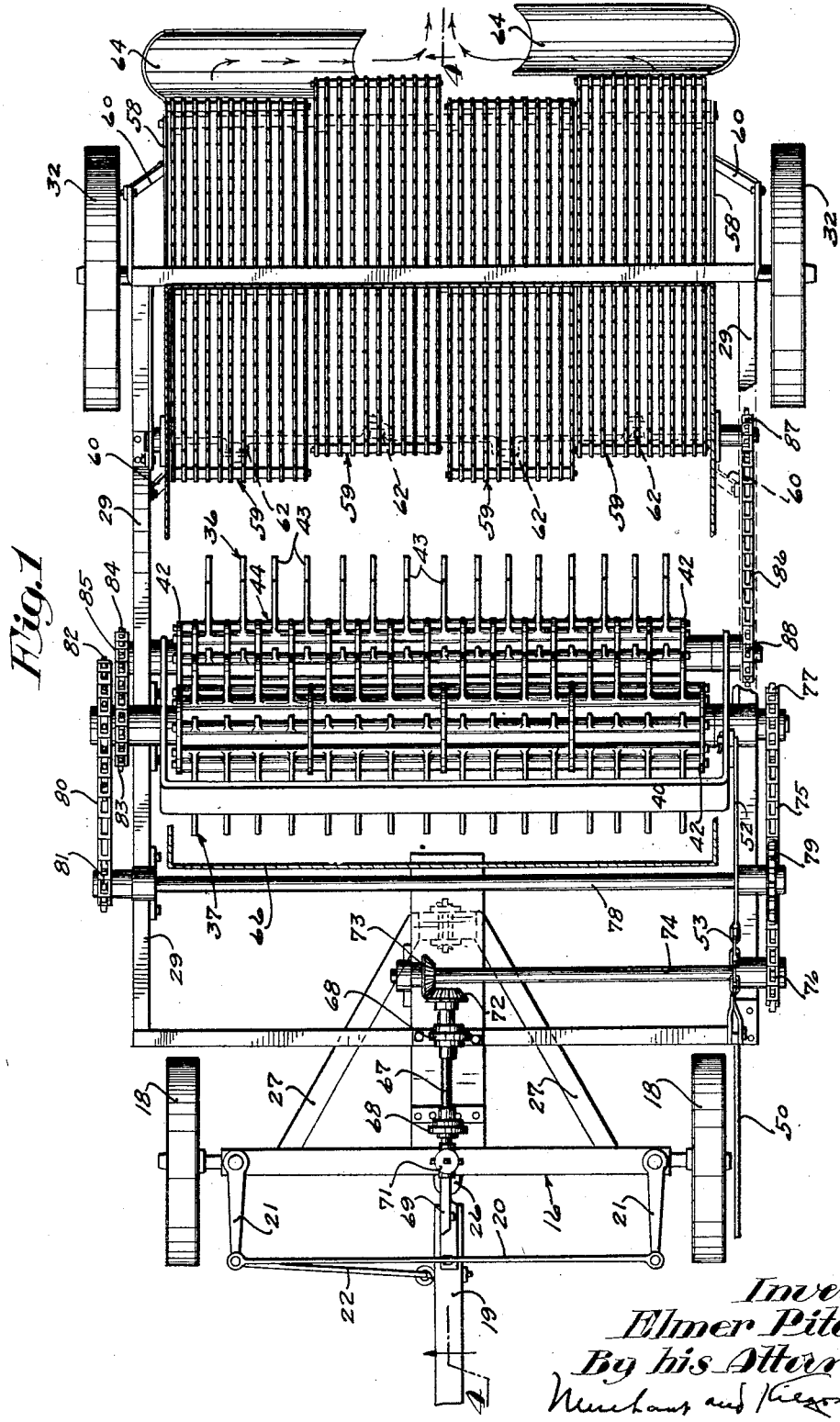
Fig. 1 is a view of the improved quack grass digger principally in plan with some parts being broken away and other parts shown in horizontal section.
Figure 7:
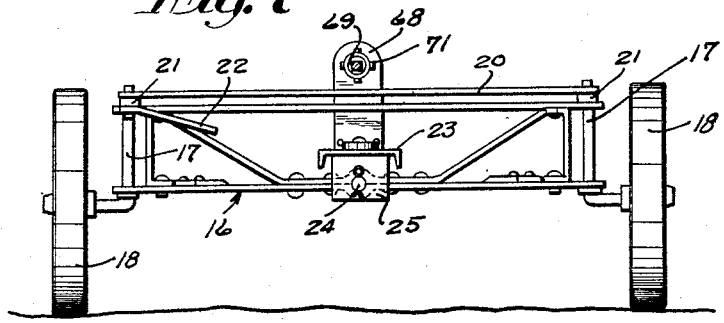
Fig. 7 is a front end elevation of the tongue truck with some parts removed.

The invention, as illustrated, is designed to be drawn and operated by a tractor and for the purpose of this case it is only thought necessary to fragmentarily show the rear axle housing 11 to which is attached a hitch 12 for the quack grass digger and the differential housing 13 on which is mounted a bearing 14 for the rear end portion of a longitudinal shaft 15 driven from the engine of said tractor.

The chassis of the quack grass digger includes a tongue truck, a frame and rear axle and wheels. Said tongue truck includes a front truss-like axle 16, steering knuckles 17, front wheels 18, journaled on the spindles of said knuckles, a tongue 19, tie-rod 20, connecting the arms 21 on the upper ends of the steering knuckles 17, connecting rod 22, connecting one of the arms 21 to the tongue 19 and reach 23.

The front axle 16 is made up of upper and lower vertically spaced bars rigidly connected near their ends by short channel members and a pair of oblique internal braces formed from a single bar the ends of which are rigidly secured in the upper corners of said axle and the intermediate portion of said bar is straight and rigidly secured to the lower bar of the axle 16. Formed between the lower and brace bars of the front axle 16 is a seat in which a horizontal king-pin 24, that extends longitudinally of the machine, is mounted intermediate of its ends. The steering knuckles 17 are journaled in the end portions of the upper and lower bars of the axle 16 outward of the end members of said axle.

Figure 8:
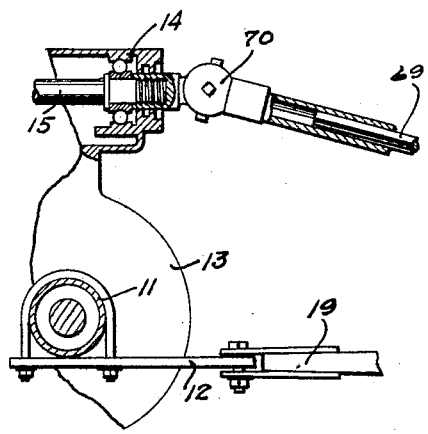
Fig. 8 is a fragmentary detail view, with some parts sectioned, of the power take-off and hitch, on an enlarged scale.

The reach 23, as shown, is an inverted wide channel bar which extends longitudinally of the machine and has on its front end portion a fixed depending yoke-like or U-shaped bearing 25 that straddles the lower and brace bars of the axle 16 and its prongs are pivoted to the end portions of the king-pin 24. A flexible separable coupling 26 connects the tongue 19 to the front end of the reach 23. The front end of the tongue 19 is pivotally attached to the hitch 12, as shown in Fig. 8.

A pair of rearwardly converging radius rods 27 connect the axle 16, at its outer end, to the rear end of the reach 23 and the connection between said radius rods and reach is a pivot pin 28 axially aligned with the king-pin 24. This pivot pin 28 is mounted in a bearing on the reach 23 similar to the bearing 25.

The frame 29, as shown, is a rectangular structure comprising a pair of channel side members and a pair of channel end members. Said frame 29 further includes an intermediate cross-tie channel member 30 near the front end of said frame. The front end member of the frame 29 and its cross-tie member 30 rest, at their longitudinal centers, on the reach 23 and are rigidly secured thereto. The frame 29 has a raised rear end portion.

On the spindles of the rear axle 31 is journaled a pair of rear wheels 32. This rear axle 31 is of the tilting, crank-acting type and its intermediate portion, on which the rear end of the frame 29 rests, is journaled in a pair of bearings on said frame. A pair of oblique brace rods 33 normally hold the rear axle 31 from tilting. These brace rods 33 are attached at one of their ends to the spindles of the rear axle 31 inward of the wheels 32 and their other ends are attached by bolts 34 to angle brackets 35 on the side members of the frame 29. Said bolts 34 are passed through aligned holes in the brace rods 33 and brackets 35. To vary the operative length of the brace rods 33, to hold the axle 31 in different tilted positions, there is formed in each of said rods a longitudinal row of holes through any one of which the respective bolt 34 may be passed.

Mounted on the frame 29 between the tongue truck and rear wheels 32 is a transverse lower or pick-up beater 36 and a cooperating upper or combing beater 37 and between said rear wheels is a shaker 38. The two beaters 36 and 37 in construction are identical the one with the other and the lower beater 36, which is fully illustrated in detail, will be described in detail and the description thereof will suffice for the description of the upper beater 37. The shaft 39 of the upper beater 37 extends transversely over the frame 29 and is journaled in bearings on the side members of said frame.

The lower beater 36 is carried by the arms of a heavy yoke 40 which extends transversely of the frame 29 with its transverse portion overlying the upper beater 37 and with its arms pivoted, intermediate of their ends, on the shaft 39 for swinging movement longitudinally of the frame 29. Said lower beater 36 comprises a shaft 41, a skeleton drum 42 and teeth 43.

The drum 42 is made up of a plurality of axially spaced heads rigidly secured to the shaft 41 and a plurality of circumferentially spaced peripheral shafts mounted in aligned seats in said heads. Turnably mounted on each peripheral shaft of the drum 42, between adjacent heads of said drum, is a long hub 44 held against endwise movement by said heads. The teeth 43 are formed with the hubs 44 and on each of said hubs are four of said teeth laterally spaced in a single row.

Figure 10:
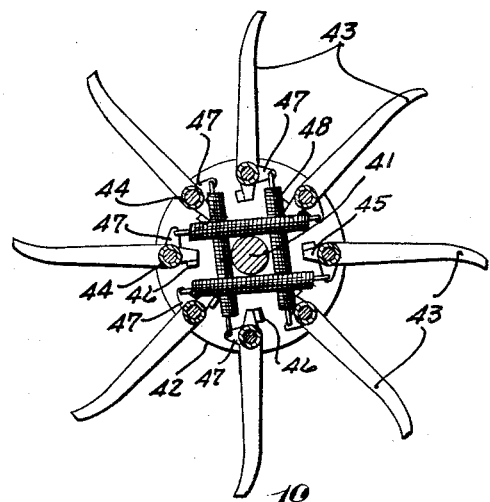
Fig. 10 is a view partly in elevation and partly in section taken on the line 10—10 of Fig. 9.
Figure 9:
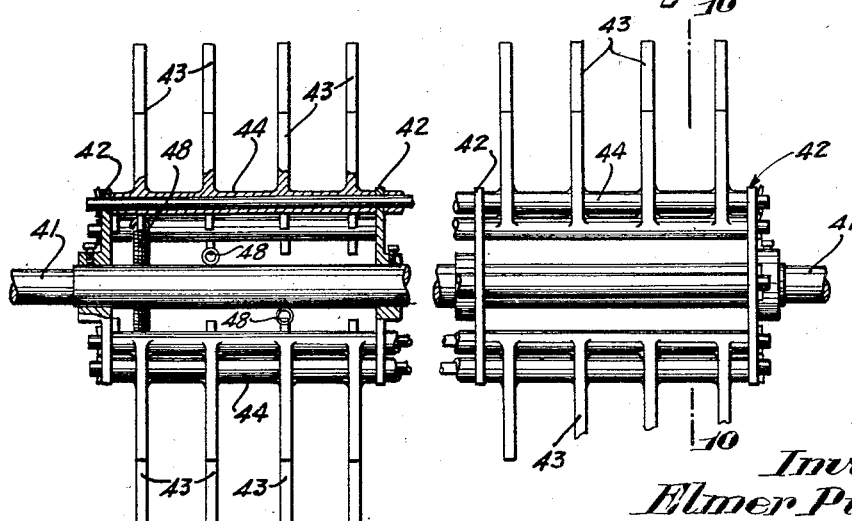
Fig. 9 is a fragmentary detail view partly in elevation and partly in section taken on the line 9—9 of Fig. 4, on an enlarged scale.

On one of the ends of each hub in the group between each pair of heads is a stop finger 45, which forms inner extensions of the teeth 43, and on the adjacent head is a stop lug 46 for each stop finger 45, see Fig. 10. Formed on the hubs 44, in the plane of each finger 45, are short crank-arms 47 in bell-crank arrangement with said fingers. As shown, there are eight circumferentially spaced rows of teeth 43 in each group and four coiled springs 48 connect substantially diametrically opposite teeth 43 and normally hold their fingers 45 against the stop lugs 46, see Figs. 9 and 10.

The yoke 40 turning about the axis of the shaft 39 swings the lower beater 36 circumferentially about the upper beater 37 to raise or lower the same. Stops 49 on the side members of the frame 29 are arranged to be engaged by the arms of the yoke 40 and limit the forward and downward swinging movement of the lower beater 36.

To swing the lower beater 36 rearward to raise the same, there is provided an upright hand latch-lever 50 having a cooperating lock segment 51. The latch-lever 50 is pivoted to the left side member of the frame 29 for movement longitudinally thereof and the lock segment is rigidly secured thereto. A link 52, having a flexible section 53, connects the hand lever 50 to the left hand arm of the yoke 40 above the shaft 39, see Fig. 2.

To assist in lifting the lower beater 36, when raising the same by means of the hand lever 50 or when said beater strikes a rock or other obstruction and passes thereover, there is provided on each side of the frame 29 a counterbalancing spring 54. These springs 54 are anchored to depending brackets 55 on the front end member of the frame 29 and attached to one of the arms of a pair of bell-cranks 56 pivoted to the under sides of the side members of said frame. The other arms of the bell-cranks 56 are connected by links 57 to the arms of the yoke 40 above the shaft 39, see Fig. 2.

The shaker 38 includes a main frame 58 and four laterally spaced sections each made up of a plurality of laterally spaced tooth bars 59. Said main frame 58 is suspended under the rear axle 31 and at each end by a pair of hanger bars 60 pivoted at their lower ends to said frame and at their upper ends to the frame 29.

To hold the shaker 38 at different elevations above the ground the hanger bars 60 are provided with rows of holes spaced longitudinally thereof for bolts, which pivotally connect said bars to the frame 29. The inclination of the shaker 38 may also be varied by longitudinally adjusting the hanger bars 60 on the frame 29. Short rocker links 61 independently support the sections of the shaker 38 from the frame 58 for reciprocatory movement longitudinally of the machine and the front ends of said sections are supported on cranks 62 on a crank shaft 63 journaled in said frame and by which cranks the sections of the shaker 38 are reciprocated. The cranks 62 of adjacent sections of the shaker 38 are set 180° apart and the brackets connecting the crank 62 to said shaker sections are of sufficient length to prevent the bars 59 from hitting the crankshaft 63.

Materials on the shaker 38 are collected in a pair of aligned troughs 64 which extend transversely of the machine. There is one of these troughs 64 for each of the two outer sections of the shaker 38 and these are rigidly secured by brackets 61' to the links 61. Said links 61 support the troughs 64 for bodily transverse movements longitudinally of the machine during the reciprocatory movements of the shakers 38 and at the same time impart rocking movements to said troughs. These troughs 64 are downwardly and inwardly inclined and endwise spaced to discharge the collected materials therein in a common windrow on the ground at the transverse center of the machine.

To hold the shaker 38 a predetermined and constant distance from the lower beater 36 there is provided a pair of links 65 which connect the shaft 41 of said beater to the crank shaft 63, see Figs. 2 and 3. These links 65 hold the shaker 38 against swinging movement in respect to the lower beater 36 and impart bodily movements thereto when said beater is raised or lowered.

An open bottom sheet metal housing and deflector 66 is provided for the beaters 36 and 37 and shaker 38, snugly fits between the side members of the frame 29, between the rear end and intermediate members of said frame and is rigidly secured thereto, see Fig. 4.

The upper beater 37 is driven, in the direction of the arrows indicated therearound in Fig. 4, from the tractor driven shaft 15 by the following connections, to wit: A short horizontal longitudinally extended shaft 67 is journaled in front and rear bearings 68, the former of which is on the reach 23 and the latter on the front end member of the frame 29, see Fig. 4. Between the shafts 15 and 67 is a longitudinally extensible and contractable shaft 69 comprising telescopically connected members, one of which is connected by a universal joint 70 to the shaft 15 and the other member of which is connected by a universal joint 71 to the shaft 67. This shaft 69 and universal joints 70 and 71 compensate for varying movements between the tractor and quack grass digger and it will be noted that the universal joint 71 is directly over the king-pin 24 to permit transverse rocking of the front axle 16. On the rear end of the shaft 67 is a miter gear 72 which meshes with a like gear 73 on the right hand end of a transverse shaft 74 journaled in a pair of bearings, one of which is on the reach 23 and the other of which is on the left hand side member of the frame 29. A sprocket chain 75 runs over a pair of aligned sprocket wheels 76 and 77 on the left hand ends of the shaft 74 and upper beater shaft 39, respectively, outward of the frame 29.

The lower beater 36 is driven, in the direction of the arrows indicated therearound in Fig. 4, from the sprocket chain 75 by a transverse shaft 78 journaled in bearings on the side members of the frame 29 and having on its left hand end a sprocket wheel 79 which overlies said chain and is in toothed engagement with the upper run thereof. A sprocket chain 80 runs over a relatively small sprocket wheel 81 on the right hand end of the shaft 78 and a relatively large sprocket wheel 82 loose on the upper beater shaft 39. On the same hub with the sprocket wheel 82 is a relatively small sprocket wheel 83, aligned therewith on the lower beater shaft 41 is a relatively small sprocket wheel 84 and a sprocket chain 85 runs over said two sprocket wheels 83 and 84. The ratio of the driving connections for the upper beater 37 and lower beater 36 is such that said upper beater is driven at a peripheral speed substantially five times that of said lower beater so that there is a combing action set up by the teeth of the upper beater 37 between the teeth of the lower beater 36 that quickly and efficiently removes all materials carried upward on the teeth of said lower beater.

The crank shaft 63 which reciprocates the sections of the shaker 38 is driven from the lower beater shaft 41 by a short sprocket chain 86 which runs over aligned sprocket wheels 87 and 88 on the left hand ends of said two shafts 63 and 41, respectively. As the swinging movement of the lower beater 36 about the axis of the upper beater 37 is in a true circle the tension of the sprocket chain 85 is always the same in the different positions of said lower beater. The links 65 always keep the crank shaft 63 the same distance from the lower beater shaft 41 and hence the tension of the sprocket chain 86 is always the same.

To secure the best results with the improved quack grass digger the field is first plowed to the desired depth and thereafter gone over with the quack grass digger.

The operator before starting the tractor manipulates the hand lever 50 to lower the pick-up beater 36 so that its teeth project into the ground the desired distance, preferably to a depth slightly less than that to which the field is plowed. No other attention need be given the quack grass digger as the same is steered and operated from the tractor. The revolving teeth of the pick-up beater 36 working in the ground remove and pick-up all quack grass as well as straw, stubble and other rubbish on the field and carry the same upward on its teeth where it is engaged with a combing action by the teeth of the upper beater 37 and thrown thereby rearward in the direction of the arrows marked on Fig. 4, and precipitated onto the shaker 38.

During the lifting movement of the quack grass and other materials by the pick-up beater 36 all loose dirt drops therefrom between the teeth of said beater and back onto the ground. Any dirt clinging to the quack grass roots, clods and the like, will be broken by the combing action of the teeth of the upper beater 37 between the teeth of the lower beater 36. Materials precipitated onto the shaker 38 are agitated and worked backward thereon by the tooth bars 59 and at which time any remaining loose dirt on the shaker 38 will be precipitated between the bars thereof and onto the ground, as indicated by arrows in Fig. 4.

From the rear end of the shaker 38 the materials are worked into the troughs 64 by the agitation of the tooth bars 59. The agitation of the shaker 38 by the crank shaft 63 will also agitate the troughs 64 so that materials therein are worked downward and inward and deposited on the ground between said troughs in a single windrow. This windrow after lying on the ground a sufficient length of time to dry, or at least partly dry, is burned and the dry grass, weeds mixed with the quack grass, materially assist in the burning of the quack grass.

In case one of the teeth of the lower beater 36 strikes a rock or other obstruction the respective spring 48 will yield and permit said tooth to move over the obstruction without damaging the machine. In case the lower beater 36 strikes a large obstruction the entire beater 36 will lift, which is permitted by the flexible section 53 in the link 52, and pass over the obstruction, and then return by gravity to operative position.

The housing and deflector 66 will direct the materials from the beaters 36 and 37 to the shaker and prevent the light materials from being blown by the wind over the field. In addition to removing the quack grass from the field the working of the soil by the lower beater 36 pulverizes the same and leaves an ideal seed bed.

What I claim is:

1. In a device of the class described, a tooth-equipped rotary pick-up beater, a driven tooth-equipped rotary combing beater, the teeth of the combing beater being arranged to work between the teeth of the pick-up beater, and means for driving the pick-up beater from the combing beater and at a reduced speed.

2. In a device of the class described, a tooth-equipped rotary pick-up beater and a cooperating tooth-equipped rotary combing beater, said pick-up beater being mounted to swing about the axis of the combing beater for raising and lowering movements and a yielding counterbalancing device for the pick-up beater.

3. In a device of the class described, a beater including a drum and circumferentially spaced rows of laterally spaced teeth, said drum comprising a drive shaft, axially spaced heads on the shaft, circumferentially spaced peripheral shafts mounted in said heads, long hubs turnably mounted on said shafts between the heads, said rows of teeth being rigidly secured to said hubs, circumferentially spaced stop lugs on the drum heads, fingers on the hubs arranged to engage said stops to position said hubs with the rows of teeth in operative positions, short crank-acting arms on the hubs, and springs connecting substantially diametrically opposite crank-acting arms and normally holding the hubs with their fingers against said stops.

4. In a device of the class described a pick-up beater, and a cooperating combing beater, a shaker arranged to receive materials from the combing beater, and means for collecting materials from the shaker and depositing the same in a windrow on the ground.

5. In a device of the class described, a pick-up beater, a combing beater, a shaker, and means for deflecting materials from the beaters onto the shaker.

6. In a device of the class described, a pick-up beater, a combing beater, said beaters being arranged to throw materials therefrom at a higher elevation, a shaker, and means for deflecting materials thrown from the beaters onto the shaker.

7. The structure defined in claim 5 in which the deflecting means is a housing that is closed except at its bottom.

8. In a device of the class described, a shaker, means for operating the shaker, and a trough at the delivery end of the shaker extending transversely thereof and arranged to receive materials therefrom, said trough being connected to the shaker for movement therewith.

9. In a device of the class described, a shaker, supporting means for the shaker including an upright link pivoted at its lower end to a relatively fixed support and at its upper end to the shaker, means for reciprocating the shaker, and a trough at the delivery end of the shaker extending transversely thereof and arranged to receive materials therefrom, said trough being connected to the link for movement with the shaker.

10. In a device of the class described, a shaker, a pair of links supporting the rear end of the shaker for movement longitudinally of the device, said links being pivoted at their lower ends to a relatively fixed support and at their upper ends to the shaker, and a trough extending transversely of the shaker and carried by the links in position to receive materials from the shaker.

11. In a device of the class described a pick-up beater and a cooperating combing beater, a shaker arranged to receive materials from the combing beater, and a transverse trough carried by the shaker, arranged to receive materials therefrom and deposit the same on the ground in a windrow.

In testimony whereof I affix my signature.

ELMER PITCHER.